(12) United States Patent
Ruuskanen

(10) Patent No.: US 11,535,206 B1
(45) Date of Patent: Dec. 27, 2022

(54) ENCODER AND PROGRAMMABLE LOGIC CONTROLLER (PLC) IMPLEMENTATION FOR A ROTARY BRUSH AUTOMATIC CAR WASH SYSTEM

(71) Applicant: Timo Antero Ruuskanen, Ann Arbor, MI (US)

(72) Inventor: Timo Antero Ruuskanen, Ann Arbor, MI (US)

(*) Notice: Subject to any disclaimer, the term of this patent is extended or adjusted under 35 U.S.C. 154(b) by 135 days.

(21) Appl. No.: 17/301,561

(22) Filed: Apr. 7, 2021

(51) Int. Cl.
| | |
|---|---|
| *B60S 3/06* | (2006.01) |
| *A46B 13/02* | (2006.01) |
| *A46B 15/00* | (2006.01) |
| *A46B 13/00* | (2006.01) |
| *B60S 3/04* | (2006.01) |

(52) U.S. Cl.
CPC ............ *B60S 3/063* (2013.01); *A46B 13/001* (2013.01); *A46B 13/02* (2013.01); *A46B 15/0006* (2013.01); *A46B 2200/3046* (2013.01); *B60S 3/04* (2013.01)

(58) Field of Classification Search
CPC ............... B60S 3/06; B60S 3/04; A46B 13/02
See application file for complete search history.

(56) References Cited

U.S. PATENT DOCUMENTS

| | | | |
|---|---|---|---|
| 4,299,003 A | 11/1981 | Ennis | |
| 4,359,796 A | 11/1982 | Holbus et al. | |
| 4,424,602 A | 6/1984 | Belanger et al. | |
| 4,453,284 A | 6/1984 | Schleeter | |
| 4,530,126 A | 7/1985 | Belanger | |
| 4,562,848 A | 1/1986 | Messing et al. | |
| 5,325,559 A | 7/1994 | Belanger et al. | |
| 5,410,770 A | 5/1995 | Nittoli | |
| 5,432,974 A | 7/1995 | Yasutake et al. | |
| 5,447,574 A | 9/1995 | Inoue | |
| 5,461,745 A | 10/1995 | Nittoli | |
| 5,911,231 A | 6/1999 | Turner et al. | |
| 7,506,394 B2 | 3/2009 | Prater et al. | |
| 2006/0218734 A1* | 10/2006 | Prater | B60S 3/063 15/53.2 |
| 2013/0104322 A1* | 5/2013 | Yeaglin | B60S 3/04 15/53.1 |
| 2017/0203736 A1* | 7/2017 | Belanger | B60S 3/04 |
| 2019/0248341 A1* | 8/2019 | Livingston, Jr. | B60S 3/04 |

FOREIGN PATENT DOCUMENTS

EP 1106457 A2 6/2001

* cited by examiner

*Primary Examiner* — Michael D Jennings

(57) ABSTRACT

This invention relates to an automatic vehicle wash apparatus employing one or more rotary cloth or foam rubber brushes, and more particularly to the way how the rotary brush to vehicle surface contact is managed using one or more encoders connected to the rotating shaft of each brush and one or more programmable logic controllers (PLC). The encoders, recording the revolutions per minute (RPM) of each brush shaft, provide input to the programmable logic controller. If the RPM value is at or above the high RPM limit, the pivoted boom will move the brush toward the vehicle to achieve a desired brush-to-washable surface contact. If, on the other hand, the RPM value is at or below the low RPM limit, the pivoted boom will move the brush away from the vehicle to achieve a desired brush-to-washable surface contact.

1 Claim, 1 Drawing Sheet

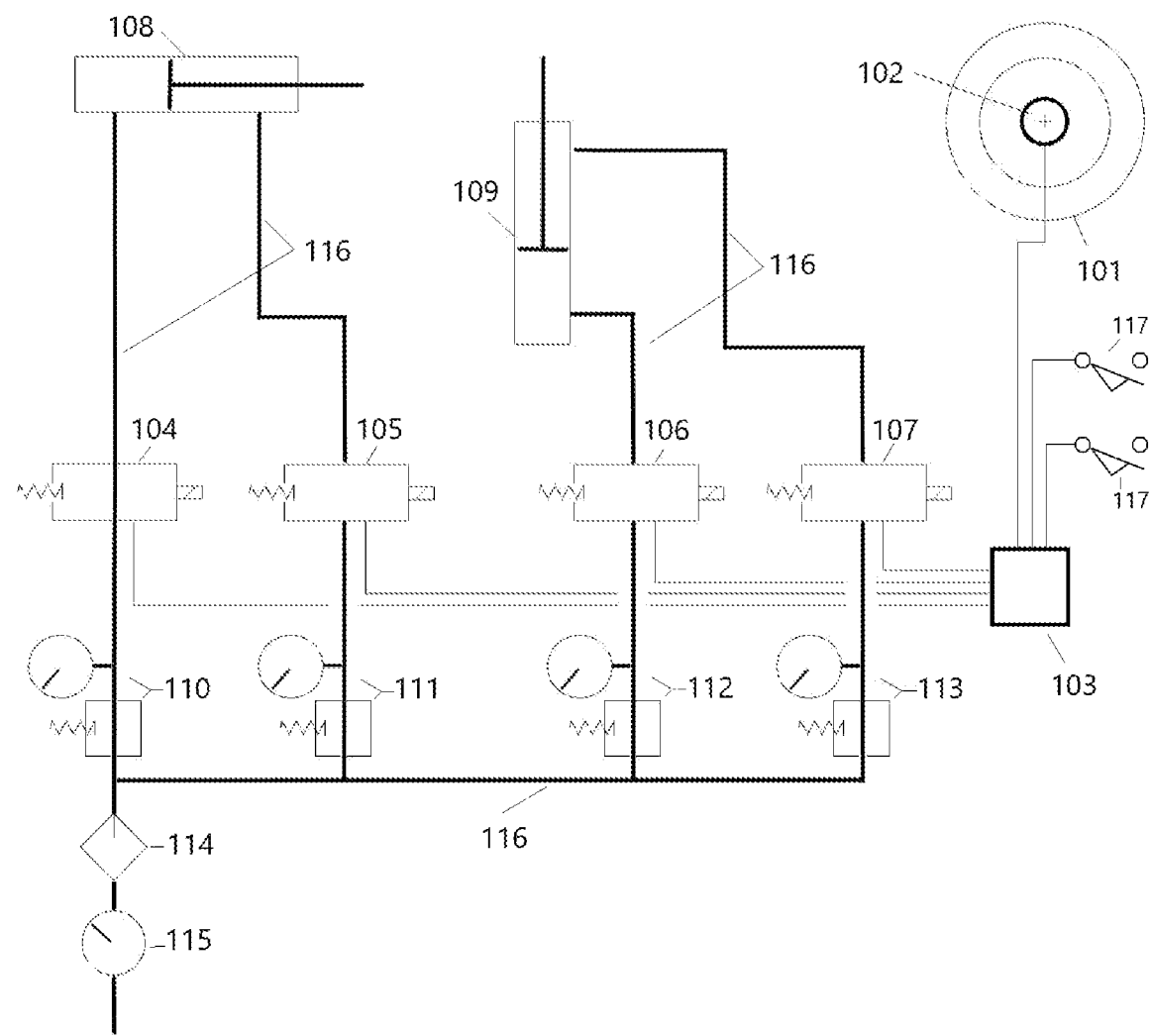

ENCODER AND PROGRAMMABLE LOGIC CONTROLLER (PLC) IMPLEMENTATION FOR A ROTARY BRUSH AUTOMATIC CAR WASH SYSTEM

CROSS-REFERENCE TO RELATED APPLICATIONS

Provisional Application No. 63/040,357 of Jun. 17, 2020.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISK APPENDIX

Not Applicable.

CROSS-REFERENCE TO RELATED PATENTS

Not Applicable.

ATTORNEY, AGENT OR FIRM

Not Applicable
Classification
U.S. Cl. 15/97.3; 15/4; 15/53.2; 15/53.3; 15/97 B; 15/53 AB; 15/DIG. 2
Field of Search 15/97.3; 15/4; 15/53.2; 15/53.3; 15/53 A, 53 AB, 97 B, 15/DIG. 2; 134/6

REFERENCES CITED

U.S. PATENT DOCUMENTS

| | | | |
|---|---|---|---|
| 9290162B1 | Mar. 22, 2016 | Gesy | B60S3/066 |
| 7506394B2 | Mar. 24, 2009 | Prater et al. | B60S3/063 |
| 5911231A | Jun. 15, 1999 | Turner et al. | B60S3/002 |
| 5461745A | Oct. 31, 1995 | Nittoli | A46B3/18 |
| 5447574A | Sep. 5, 1995 | Inoue | B08B3/024 |
| 5432974A | Jul. 18, 1995 | Yasutake et al. | B60S3/002 |
| 5410770A | May 2, 1995 | Nittoli | AA6B13/005 |
| 5325559A | Jul. 5, 1994 | Belanger et al. | B60S3/063 |
| 4562848A | Jan. 7, 1986 | Messing et al. | B60S3/06 |
| 4530126A | Jul. 24, 1985 | Belanger | B60S3/063 |
| 4453284A | Jun. 13, 1984 | Schleeter | B60S3/063 |
| 4424602A | Jan. 10, 1984 | Belanger et al. | B60S3/063 |
| 4359796A | Nov. 23, 1982 | Holbus et al. | B60S3/063 |
| 4299003A | Nov. 11, 1981 | Ennis | B60S3/063 |
| 3921243A | Nov. 25, 1975 | Takeuchi | B60S3/063 |
| 3840931A | Oct. 15, 1974 | Bivens | B60S3/063 |
| 3772725A | Nov. 21, 1973 | Shelstad | B60S3/063 |
| 3675262A | Jul. 12, 1972 | Mello | B60S3/063 |
| 3662419A | May 16, 1972 | Dini | B60S3/063 |
| 3626537A | Dec. 14, 1971 | Wilson | B60S3/063 |
| 3581334A | Jun. 1, 1971 | Follis | B60S3/063 |
| 3570034A | Mar. 13, 1971 | Lanfrankie | B60S3/063 |
| 3428983A | Feb. 25, 1969 | Seakan | |
| 3403416A | Oct. 2, 1968 | Hurwitz | |

International Patents

EP1106457A2 Jun. 13, 2001 Messing

FIELD OF THE INVENTION

This invention relates to an automatic vehicle wash apparatus employing one or more rotary cloth or foam rubber brushes, and more particularly to the way how the rotary brush to vehicle surface contact is managed and controlled using one or more encoders connected to the rotating shaft of each brush and one or more programmable logic controllers (PLC), connected to one or more double-acting air, or alternatively hydraulic, pressure cylinders.

BACKGROUND OF THE INVENTION

This section discusses briefly the relevant prior art.

One type of an automatic car wash apparatus is proposed in U.S. Pat. No. 7,506,394B2 by Prater et al. issued Mar. 24, 2009. Claim 1 (subsection d)) mentions that the apparatus includes "a power cylinder" "which forcibly drives the brush". And further, claim 1 (subsection e)) discloses a "control system for toggling the power cylinder between actuation conditions as a function of angular displacement of the brush support relative to the support base". Still further, claim 12 discloses a "control system for triggering actuation of car wash function in response to a pre-determined degree of angular movement of a pivotally mounted brush support boom."

In U.S. Pat. No. 5,911,231A issued to Turner et al. on Jun. 15, 1999, an automatic car wash apparatus is disclosed in which the car wash is a "drive-through" vehicle wash including a "plurality of gantries defining a tunnel through which the vehicle passes."

In U.S. Pat. No. 5,461,745A issued to Nittoli on Oct. 31, 1995, a vehicle wash apparatus employing a "curtain assembly for prolonging the life of the brush assembly . . . " is disclosed.

U.S. Pat. No. 5,447,574A issued to Inoue on Sep. 5, 1995, discloses the use of a "plurality of photo sensors" which "detect the vehicle body", and thereby control the "movement of the portal frame".

U.S. Pat. No. 5,432,974A by Yasutake, issued on Jul. 18, 1995, discloses (Abstract) "a car washing machine having a tunnel-shaped stationary car washing machine body installed on the floor and adapted to continuously wash a vehicle as the latter is transported by a pair of roller conveyors". Section "Description of the preferred embodiments" (Column 5 (lines 63-68), and Column 6 (lines 1-30)) disclose the utilization of weights, pullies, sprockets and chain to move the brush toward and away from the vehicle surface to be washed. (Claim 10) discloses that a "pair of swing brushes" is provided "on each respective side and rotating around a vertical shaft", and "at least one swing brush being movable toward and away from the other swing brush". Claim 11 repeats the same statement for a "pair of side brushes" provided on each "respective side", and that "one side brush" is "movable toward and away from the opposed side brush".

U.S. Pat. No. 5,410,770A by Nittoli, issued on May 2, 1995, discloses (in claim 20) a car wash apparatus in which the "position of each individual brush element" "can be adjusted independently" "to compensate for wear".

U.S. Pat. No. 5,325,559A issued to Belanger et al. on Jul. 5, 1994, discloses (in the Abstract section) about the structure of a car wash apparatus that the apparatus consists of "booms" pivoting "relative to the structural frame "allowing the wraparound wheels" (brushes) "to follow the contour of the vehicle". The section "Best Modes" (Paragraph 6) discloses further that the brush axes "are inclined" from the vertical. The same section ("Best Modes", Paragraph 7) further discloses that the "proper force of the side wheels" (brushes) "is maintained by actuators", and further that the actuators "include a spring member, providing means to urge the side wheels" (brushes) "inwardly, as well as a hydraulic damper".

U.S. Pat. No. 4,562,848A issued to Messing et al. on Jan. 7, 1986, discloses (in Section Summary of the Invention, lines 8-13, and in claim 5) the utilization of "photocells" "to permit non-contact guidance of the cleaning element along the contour of the car".

U.S. Pat. No. 4,530,126A by Belanger, issued on Jul. 24, 1985, discloses (in section "Abstract") a vehicle wash apparatus which includes a "pneumatic-hydraulic circuit" and an "actuating cylinder" for the purpose of "moving the wheel arms and connected scrubbing wheels" (brushes) "relative to the predetermined path to the vehicle". Further, (in section "Summary of the Invention", Paragraph 6, as well as in claim 5, in claim 14, and in claim 14) the invention discloses that the "hydraulic-pneumatic circuit includes a pilot operated check valve for locking the arms so as not to do damage to the vehicle".

U.S. Pat. No. 4,453,284A, issued on Jun. 13, 2984 to Schleeter, discloses (in section Abstract) that "a car washer for a stationary car" utilizes "upright rotary scrubbers on arms which swing toward and away from the automobile body", and the rotary scrubbers "requiring reversing" of the rotation direction when the "mobile arc frame reverses its direction". Further, the same patent (in section "Summary of the Invention", column 3, lines 18-22) discloses that the "side scrubbers, operating under relatively low torque, can be stopped easily in the event one of the scrubber strips . . . should become entangled".

U.S. Pat. No. 4,424,602A, issued on Jan. 10, 1984 to Belanger et al., discloses (in the section "Operation" (column 9, lines 63-68) that as a result of the "frictional action between the scrubbing wheel" (brush) "as it rotates with respect to the vehicle body, the carriage moves along the boom and operatively along the corresponding side or portion of the car body". It is further disclosed (column 10, lines 34-38) that the "air pressure during such movement is still applied to the boom cylinder which holds the rotating wheel against the car body and dampens the vibrations of the boom." A limit switch (section "Operation", column 10, lines 39-48) is used at each end of the "boom" to identify corners of the vehicle. The limit switches actuate and operate the air pressure cylinders for the wash operation of the front, side and rear of the vehicle. Claim 1 (column 12, lines 48-55) discloses that the "rotating wheel in registry with the side of the vehicle body and said carriage being adapted to move freely toward said one end of said boom as the wheel scrubs the side of the vehicle body as a result of contact between the rotating wheel and the moving vehicle".

U.S. Pat. No. 4,359,796A issued to Holbus et al. on Nov. 23, 1982, disclose that the brush support "cage can be tilted" and the boom can be moved outwardly and inwardly between two positions. It is further disclosed that the boom and cage mechanism are "positioned by the action of the passing car" and "moved relative to a support by gravity".

U.S. Pat. No. 4,299,003A issued to Ennis on Nov. 11, 1981, disclose that a rotating brush uses friction to move the brush ("walks the brush along the surfaces of the vehicle"). It is further disclosed that the invention uses a "flexible coupling" on the brush shaft and support "to permit the brush too tilt or swing in any direction.". In the "Summary" section it is stated, that the "rotating brush assembly" is capable of washing the vehicle "without the use of any positive action power control system for moving the brush assembly relative to the position of the vehicle."

Still other related inventions, including U.S. Pat. No. 3,921,243A (Takeuchi, Nov. 25, 1975), U.S. Pat. No. 3,840,931A (Bivens, Oct. 15, 1974), U.S. Pat. No. 3,772,725A (Shelstad, Nov. 21, 1973), U.S. Pat. No. 3,675,262A (Mello, Jul. 12, 1972), U.S. Pat. No. 3,662,419A (Dini, May 16, 1972), U.S. Pat. No. 3,626,537A (Wilson, Dec. 14, 1971), U.S. Pat. No. 3,581,334A (Follis, Jun. 1, 1971), U.S. Pat. No. 3,570,034A (Lanfrankie, Mar. 16, 1971), U.S. Pat. No. 3,428,983A (Seakan, Feb. 25, 1969), U.S. Pat. No. 3,403,416A (Hurwitz, Oct. 2, 1968), U.S. Pat. No. 9,290,162B1 (Gesy, Mar. 22, 2016), disclose various biasing means, brush shaft angles, gravity, weights, cables, pullies, tensions springs, and counter weights to enable the wash operation and affect the rotating brush to vehicle surface contact force.

The relevant international patent EP1106457A2 (European Patent Office), issued to Messing on Jun. 13, 2001 discloses the use of pneumatic or hydraulic cylinders to affect pressing the rotating, tiltable (in German "schwenkbar" see section "Beschreibung" [0011]), vertical brush against the vehicle surface (in German, "gegen das Fahrzeug gedrueckt wird", see section "Beschreibung" [0011]). It is further stated in claim 2 and in claim 3 (section in German "Patentansprueche"), that the pressure in the pneumatic or hydraulic cylinders is adjustable and preset (in German "mit einem voreinstellbaren Druck").

The herewith reviewed and referenced patents describe various structures, components, brush arrangements and operating principles for an automatic vehicle wash apparatus. The problem identified, but not satisfactorily solved, is how to continuously manage the rotating brush to the vehicle contact to achieve the best possible, uniform, brush to vehicle contact, and, thereby, the best possible vehicle wash outcome. The various mechanical—, electromechanical,—and gravity based biasing means to effect pressure or force between the rotating brush and the vehicle surface do work, and are in many cases manually adjustable, but do not result into a uniform satisfactory wash outcome.

BRIEF SUMMARY OF THE INVENTION

This invention relates to an automatic vehicle wash apparatus employing one or more rotary cloth or foam rubber brushes, and more particularly to the way how the rotary brush to vehicle surface contact is managed and controlled using one or more encoders connected to the rotating shaft of each brush and one or more programmable logic controllers (PLC). The encoder, recording the revolutions per minute (RPM) of the brush shaft, provides input to the programmable logic controller (PLC). The programmable logic controller, using the encoder input, then signals a pair of double-acting solenoid valves to increase or decrease air pressure to a double-acting air pressure cylinder to effect a move of the carriage of the brush along a horizontal boom either toward the free end of the boom or toward the pivoted end of the boom. In addition, the programmable logic controller, utilizing the encoder input, signals a second pair of double-acting solenoid valves to increase or decrease air pressure to a second double-acting air pressure cylinder acting on an angle about perpendicularly to the first air pressure cylinder to effect a move of the pivoted boom laterally either toward the vehicle, if the encoder recorded RPM value is at or above the high RPM limit, or away from the vehicle, if the encoder recorded RPM value is at or below the low RPM limit, to achieve a desired brush-to-washable surface contact.

BRIEF DESCRIPTION OF THE DRAWING

FIG. 1 presents a simplified diagram of the preferred embodiment of the control mechanism for an automatic car wash system employing one or more vertical brushes suspended from one or more pivotable booms, at least one on each side of the longitudinal vehicle wash lane.

FIG. 1 shows the Brush (101), vertical rotating wheel-type brush, suspended from a brush support frame structure movably attached to a horizontal elevated boom (not shown).

FIG. 1 further shows the Rotary Encoder (102) (or shaft encoder) unmovably attached to the top of the brush support frame structure or carriage. The encoder is connected to the rotatable brush shaft at the top of the brush for the purpose of reading the brush shaft revolutions per minute (RPM). In a typical application relating to the present invention the encoder output is used to control the air pressure solenoid valves (104, 105, 106, 107) using a Programmable Logic Controller (PLC) (103).

FIG. 1 further shows the Programmable Logic Controller (PLC) (103) with inputs from at least one Rotary Encoder (102), and at least two Limit Switches (117), and with outputs to the Solenoid Valves (104), (105), (106) and (107).

In addition, FIG. 1 shows four solenoid valves. Each Solenoid Valve (104, 105, 106, 107) serves an identical purpose and function. The Solenoid modulates the Valve between open-and-closed positions based on instructions from the PLC (103) effected by the Rotary Encoder (102) input.

Still, in addition, FIG. 1 shows two double-acting air cylinders (108, 109). The Double-acting air cylinder (108) attached from one end to the boom frame structure and from the opposite end to the movable brush (101) support frame structure, or carriage, for the purpose of moving the brush (101) and brush carriage (not shown) horizontally back-and-fort on a guide or rail along the horizontal elevated boom (not shown). The Double-acting air cylinder (109) attached from one end to the vertical unmovable support post and from the opposite end to the horizontal pivoting boom frame attached to the support post for the purpose of rotating the boom laterally about the pivot end of the boom.

Further, in addition, FIG. 1 shows four adjustable Air Pressure Regulators (110, 111, 112, 113). Each air pressure regulator serves an identical purpose and function.

Still further, FIG. 1 shows the Lubricator (114), the Main air pressure gage (115), the Pneumatic tubes, hoses or lines (116).

Yet further, FIG. 1 also shows the Limit switches (117). A Limit Switch is attached to each opposite end of the boom structure on which the brush (101) carriage is movably mounted and connected to the programmable logic controller (PLC). The purpose of the Limit Switch is to stop the brush carriage movement on the boom rail or guide as the brush (101) carriage reaches the end of the boom, and then reverse the movement of the brush carriage toward the opposite end of the boom. As the brush (101) carriage is moved by the double-acting air cylinder (108) toward one end of the boom, and as the brush carriage reaches the Limit Switch, the Limit Switch is tripped sending a signal to the PLC (102) causing the Solenoid Valves (104) and (105) to change the air pressure in the Air Cylinder (108) and, thereby, stop the brush (101) carriage, and to reverse its direction of movement along the boom rail or guide, and to start to move the brush (101) carriage toward the opposite end of the boom.

DETAILED DESCRIPTION OF THE INVENTION

This invention relates to an automatic vehicle wash apparatus employing one or more rotary cloth or foam rubber brushes, and more particularly to the way how the rotary brush to vehicle surface contact is managed and controlled using one or more encoders connected to the rotating shaft of each brush and one or more programmable logic controllers (PLC). The encoders, recording the revolutions per minute (RPM) of the brush shaft, provide input to the programmable logic controller. The programmable logic controller, using the encoder input, then signals a pair double-acting solenoid valves to increase or decrease air pressure to a double-acting air pressure cylinder to effect a move of the carriage of the brush along a horizontal boom either toward the free end of the boom or toward the pivoted end of the boom. In addition, the programmable logic controller, utilizing the encoder input, signals a second pair of double-acting solenoid valves to increase or decrease air pressure to a second double-acting air pressure cylinder acting on an angle about perpendicularly to the first air pressure cylinder to effect a move of the pivoted boom laterally either toward the vehicle, if the encoder recorded RPM value is at or above the high RPM limit, or away from the vehicle, if the encoder recorded RPM value is at or below the low RPM limit, to achieve a desired brush-to-washable surface contact.

It shall be noted, considering possible brush arrangements, when a multitude of brushes, whether vertical for the front, rear and sides of the vehicle, or the roof, that the proposed invention is applicable for those car wash configurations, and are easily understood by those familiar with the art. Therefore, adaptations to various brush arrangements utilizing the presented invention do not form a new invention.

Staggering of the vertical brushes, and horizontal overhead brushes, to avoid interference between the brushes, is known from the prior art, and therefore, is not further discussed here. It shall also be understood that, for example, both a movable conveyor driven wash lane and stationary wash apparatus structure with laterally across the wash lane or longitudinally along the wash lane pivoted booms, or a fixed gantry type structure, or a stationary vehicle and movable wash apparatus are variations commonly used in vehicle wash apparatus structural systems, and in which this invention can be implemented, and are, therefore, not further discussed here.

FIG. 1 presents a simplified diagram of the preferred embodiment of the control mechanism for an automatic car wash system employing one or more vertical brushes suspended from one or more pivotable booms, at least one on each side of the longitudinal vehicle wash lane.

Initially, as the wash operation starts, the brush (101) is not in contact with the surface to be washed, and it rotates freely above or at the high RPM limit set for wash operations. Then, when the rotating brush (101) touches the surface to be washed, the friction between the brush and the surface causes the brush RPM to decrease. The RPM is continuously read by the encoder (102) mounted on the brush carriage, and attached to the brush (101) shaft end.

The RPM reading by the encoder (102) is continuously sent to the input side of the programmable logic controller (PLC) (103). The PLC (103), then in turn, sends a programmed instruction (signal) to the solenoid valves (104, 105), which, by modulating each respective solenoid air-pressure valve connected via air pressure lines (116) to the double-acting air cylinder (108), adjust the position of the brush (101) carriage longitudinally movable on the rail or guide the boom, from which the brush (101) is suspended.

Similarly, the PLC (103) sends a programmed instruction (signal) to the solenoid valves (106, 107), which causes each respective solenoid air-pressure valve to modulate air-pressure connected via pressure lines (116) to the double-acting air cylinder (109), and thereby to adjust laterally the position of the pivoting boom. Thereby, the lateral pivoting movement of the boom causes the suspended brush (101) to move laterally toward or away from the surface to be washed.

The PLC is programmed to maintain the brush RPM within preset limits during the wash operation. If the current RPM is above or at the high RPM limit, then solenoid valves (106, 107) receive a programmed instruction from the PLC (103) to move the pivoted boom, and thereby the brush (101) toward the surface to be washed until the RPM is within the high and low limits. On the other hand, if the current RPM is below or at the low RPM limit, then solenoid valves (106, 107) receive a programmed instruction from the PLC (103) to move the pivoted boom, and thereby the brush (101), away from the surface to be washed. The RPM increase and decrease are caused by the brush (101) to surface contact friction. When the brush (101) moves closer to the surface to be washed, the brush-to-surface contact friction increases and the brush RPM decreases. Similarly, when the brush (101) moves away from the surface to be washed, the brush-to-surface contact friction decreases and the brush RPM increases.

What is claimed is:

1. An automatic car wash system employing one or more vertical brushes suspended from one or more pivotable booms, at least one on each side of the longitudinal vehicle wash lane, in which the vertical rotating wheel-type brush with a rotating brush shaft, suspended from a brush support carriage, is movably attached on a guide or rail attached to the laterally swingable, horizontal, elevated boom attached on one end to a fixed support post or frame structure and unattached, or free, on the opposite end, in which at least two limit switches each of which is attached to opposite ends of the said elevated boom on which the said brush support carriage is movably attached on the said rail or guide, in which the said limit switches respectively are activated by the said support carriage movement, when said brush support carriage reaches the respective end of the said boom, and transmits a "stop-and-reverse" movement data;

wherein the improvement comprises of a rotary encoder (or shaft encoder) unmovably attached to the said brush support carriage and connected to said brush shaft in which said rotary encoder reads, records and transmits the brush shaft revolutions per minute (RPM) data;

wherein the improvement comprises of at least one programmable logic controller (PLC) receiving said brush revolutions per minute (RPM) data from the said rotary encoder, and said "stop-and-reverse" data from said limit switches;

wherein the improvement comprises of at least two solenoid valves connected to said programmable logic controller (PLC) programmed to modulate the said valve between open-and-closed positions and thereby control air pressure, and thereby activity, of the first double-acting air cylinder and second double-acting air cylinder;

whereby the said first double-acting air cylinder attached from one end to the said boom frame structure and from the opposite end to the said movable brush carriage, to effect the move of the brush carriage, and thereby the brush, horizontally back-and-fort, between said limit switches, on said guide or rail along the said horizontal elevated boom, and in which the said double-acting air cylinder movement, using said encoder data, and said programmable logic controller, is programmed to adjust the said brush to vehicle contact distance within preset revolutions per minute (RPM) limits utilizing said encoder data;

whereby the said second double-acting air cylinder attached from one end to the vertical unmovable support post and from the opposite end to the said horizontal pivoting boom frame to effect the rotation of the said boom laterally about the pivot end of the said boom, and in which the said double-acting air cylinder movement, using said encoder data, and said programmable logic controller, is programmed to adjust the said brush to vehicle contact distance within preset revolutions per minute (RPM) limits utilizing said encoder data.

* * * * *